(12) United States Patent
Byeon

(10) Patent No.: US 12,179,725 B2
(45) Date of Patent: Dec. 31, 2024

(54) SYSTEM AND METHOD FOR VEHICLE STOP CONTROL

(71) Applicant: HYUNDAI KEFICO CORPORATION, Gyeonggi-do (KR)

(72) Inventor: Jae-Hoon Byeon, Gyeonggi-do (KR)

(73) Assignee: Hyundai Kefico Corporation, Gyeonggi-do (KR)

( * ) Notice: Subject to any disclaimer, the term of this patent is extended or adjusted under 35 U.S.C. 154(b) by 487 days.

(21) Appl. No.: 17/673,293

(22) Filed: Feb. 16, 2022

(65) Prior Publication Data

US 2022/0258704 A1    Aug. 18, 2022

(30) Foreign Application Priority Data

Feb. 18, 2021    (KR) .................. 10-2021-0022086

(51) Int. Cl.
| | | |
|---|---|---|
| *B60T 7/12* | (2006.01) | |
| *B60T 13/74* | (2006.01) | |
| *B60W 10/18* | (2012.01) | |
| *B60W 40/105* | (2012.01) | |
| *B60W 50/14* | (2020.01) | |

(52) U.S. Cl.
CPC .............. *B60T 7/122* (2013.01); *B60T 13/74* (2013.01); *B60W 10/182* (2013.01);
(Continued)

(58) Field of Classification Search
CPC .. B60T 13/74; B60T 2201/06; B60T 2230/08; B60T 7/122; B60T 7/22;
(Continued)

(56) References Cited

U.S. PATENT DOCUMENTS

| | | | |
|---|---|---|---|
| 10,457,145 B1 * | 10/2019 | Qiao ..................... | B60W 40/09 |
| 2004/0024513 A1 * | 2/2004 | Aizawa ................. | B60T 8/4872 |
| | | | 701/70 |

(Continued)

FOREIGN PATENT DOCUMENTS

| | | |
|---|---|---|
| DE | 10334605 A1 | 3/2004 |
| DE | 10 2019 203 056 A1 | 9/2019 |

(Continued)

OTHER PUBLICATIONS

Office Action issued on Sep. 4, 2024 in German Patent Application No. 10 2022 103 489.5.

*Primary Examiner* — Jaime Figueroa
*Assistant Examiner* — Zachary Joseph Wallace
(74) *Attorney, Agent, or Firm* — Fox Rothschild LLP

(57) ABSTRACT

A system and a method for vehicle stop control are operable such that when it is detected that a vehicle is driving in a direction opposite to the direction of a current gear stage of the vehicle, the driver is warned and the vehicle enters an emergency braking state so as to reduce the risk of an accident and improve stability of a braking system. The vehicle stop control method performed by a controller of the vehicle includes steps of: converting vehicle driving environment information into data to be used as system input information; checking whether a controller related to each of driving and braking systems of the vehicle operates normally; determining whether the vehicle is driving in a reverse direction; and performing vehicle emergency stop control when the vehicle is driving in the reverse direction.

13 Claims, 2 Drawing Sheets

(52) U.S. Cl.
CPC .......... *B60W 40/105* (2013.01); *B60W 50/14* (2013.01); *B60T 2201/06* (2013.01); *B60T 2260/04* (2013.01); *B60W 2050/143* (2013.01); *B60W 2520/06* (2013.01)

(58) Field of Classification Search
CPC ......... B60W 2050/143; B60W 10/182; B60W 2552/15; B60W 30/18036; B60W 30/18118; B60W 50/14; B60W 2520/06
See application file for complete search history.

(56) References Cited

U.S. PATENT DOCUMENTS

| | | |
|---|---|---|
| 2005/0187671 A1 | 8/2005 | Nada |
| 2015/0239437 A1 | 8/2015 | Ignaczak et al. |
| 2019/0276025 A1* | 9/2019 | Asano .................... B60W 10/04 |
| 2020/0108805 A1* | 4/2020 | Woo ........................ G01S 13/867 |
| 2020/0384961 A1* | 12/2020 | McKnight ............... B60T 8/172 |
| 2021/0146836 A1* | 5/2021 | Lee ........................ H04N 23/698 |
| 2021/0188261 A1* | 6/2021 | Song .................... B60W 40/105 |
| 2021/0300306 A1* | 9/2021 | Costin ....................... B60T 7/22 |

FOREIGN PATENT DOCUMENTS

| | | |
|---|---|---|
| KR | 1998-0047106 A | 9/1998 |
| KR | 100241954 B1 | 3/2000 |
| KR | 10-2005-0019814 A | 3/2005 |
| KR | 100770394 B1 | 10/2007 |
| KR | 10-2016-0077699 A | 7/2016 |
| KR | 10-2016-0120911 A | 10/2016 |
| KR | 10-2019-0079337 A | 7/2019 |

* cited by examiner

SYSTEM AND METHOD FOR VEHICLE STOP CONTROL

CROSS REFERENCE TO RELATED APPLICATION

The present application claims under 35 U.S.C. § 119(a) the benefit of Korean Patent Application No. 10-2021-0022086, filed Feb. 18, 2021, the entire contents of which are incorporated by reference herein.

BACKGROUND

(a) Technical Field

The present disclosure relates generally to a system and a method for vehicle stop control, more particularly, to the system and a method for vehicle stop control in which when it is detected that a vehicle is driving in a direction opposite to the direction of a current gear stage of the vehicle due to a driver's misjudgment or error, the driver is warned and the vehicle enters an emergency braking state so as to reduce the risk of an accident and improve stability of a braking system.

(b) Description of the Related Art

In modern vehicles, various mechanical elements that were conventionally installed inside a vehicle are being converted into electronic elements operated through electrical signal transmission (wiring), and a control method is also gradually changing from a physical control method by a cable, a rod, and hydraulics to an electronic control method by a sensor, an electronic control unit (ECU), and an actuator.

Recently, an x-by-wire technology which has contributed to considerable improvement of the stability and convenience of a vehicle is replacing many parts of a vehicle such as a steering system, a suspension system, a brake system, and a shift lever. Accordingly, the x-by-wire technology goes beyond existing technical limits and may provide driver-assist functions, and for example, may determine whether there is a breakdown or emergency of a vehicle during a situation in which a driver cannot intervene such that active control can be performed.

Meanwhile, unlike a manual transmission, an automatic transmission of a vehicle determines an optimal gear stage and performs gear shifting by itself without a driver manipulating the gear stage by using a shift lever in a driving state of the vehicle, and performs appropriate engine cooperative control and lock-up clutch control so as to improve the feel of gear shifting and fuel efficiency.

Particularly, the shift control of a P/R/N/D gear which can be performed only by a driver's lever manipulation in an existing vehicle having an automatic transmission can be performed without a driver's intervention by an automatic transmission to which a shift by wire is applied, so it is possible to realize a fully automatic parking system advanced further from the existing incomplete automatic parking system that requires a driver's lever manipulation.

In addition, unlike the existing manual control of a parking brake, an electronic parking brake (EPB) is automatically engaged and released according to a state of a vehicle, and may enable more convenient vehicle operation in that separate manipulation by a driver is not required.

Additionally, a vehicle to which such an EPB and the shift by wire are applied can automatically control a parking brake without a driver manipulating the parking brake and may perform a safety function according to a failure and emergency response logic.

However, a vehicle controlled by such an electronic control is influenced by the external environment and possible production deviation and obsolescence of a vehicle part such as a battery that is prone to frequent breakdowns and malfunctions. Particularly, since a vehicle is designed for passengers to ride in, the vehicle requires a reliable safety measure to effectively respond to failure of a braking system that performs braking and stopping functions.

SUMMARY

Accordingly, the present disclosure proposes a system and a method for vehicle stop control in which when it is detected that a vehicle is driving in a direction opposite to the direction of the current gear stage of the vehicle due to a driver's misjudgment or error while the vehicle is driving on an inclined road, the driver is warned of this and a control signal requesting P gear stage control and electronic parking brake (EPB) engagement is transmitted to a transmission such that the vehicle enters an emergency braking state so as to reduce the risk of an accident and improve stability of a braking system.

In order to achieve the above objectives, a vehicle stop control method of a vehicle according to the present disclosure includes steps of: converting, by a controller, vehicle driving environment information detected by a plurality of sensors mounted to the vehicle into data to be used as system input information; checking, by the controller, whether a controller related to each of driving and braking systems of the vehicle operates normally; determining, by the controller, whether the vehicle is driving in a reverse direction by the detected vehicle driving environment information; and performing, by the controller, vehicle emergency stop control when it is determined that the vehicle is driving in the reverse direction.

Here, the vehicle driving environment information may include a current gear stage of the vehicle, a position of a shift by wire, a vehicle speed, a road slope, and whether there are obstacles in front of and behind the vehicle.

In addition, the driving and braking systems of the vehicle may include an engine management system (EMS), a transmission control unit (TCU), an electronic parking brake (EPB), an electronic stability control (ESC), and a shift by wire (SBW).

In addition, the method may further include: a step (c-1) of determining whether the vehicle emergency stop control is being performed when it is checked that the vehicle is driving in a direction opposite to a direction of a current gear stage of the vehicle after the step (c).

In this case, the method may further include: a step (c-2) of determining whether each of acceleration and speed of the vehicle is a preset value or more when it is checked that the vehicle emergency stop control is not performed in the step (c-1).

In addition, when it is checked that each of the acceleration and speed of the vehicle is the preset value or more in the step (c-2), a warning sound or a warning message to inform a driver of this may be output while performing the vehicle emergency stop control, but when each of the acceleration and speed of the vehicle is less than the preset value, a current state of the vehicle may be maintained.

Furthermore, the method may further include: a step (c-3) of determining whether the current gear stage of the vehicle and a driving direction of the vehicle match with each other when it is checked that the vehicle emergency stop control is being performed in the step (c-1).

In this case, the method may further include: a step (c-4) of determining whether the vehicle is completely stopped when it is checked that the current gear stage of the vehicle and the driving direction of the vehicle match with each other in the step (c-3).

In addition, when it is checked that the vehicle is completely stopped in the step (c-4), the vehicle emergency stop control may be released.

Meanwhile, in the vehicle emergency stop control of the step (d), engagement of an electronic parking brake (EPB) of the vehicle may be requested and at the same time, a transmission of the vehicle may be controlled to perform P gear engagement.

In this case, when the vehicle is not completely stopped within a predetermined period of time despite the EPB engagement and the P gear engagement, an emergency braking of the vehicle may be performed by a gear interlock through a control of a transmission control unit (TCU).

Furthermore, when the vehicle emergency stop control is released, a driver's P, R, or D gear shifting manipulation may be accepted such that the gear stage of the vehicle is converted into an associated gear stage.

Meanwhile, a vehicle stop control system according to the present disclosure includes: a controller to which vehicle driving environment information detected by the sensors mounted to a vehicle is transmitted, the controller being configured to identify a current driving state of the vehicle by the driving environment information and to transmit a control signal to each of an electronic parking brake (EPB) and a transmission control unit (TCU) so as to perform vehicle emergency stop control when it is determined that the vehicle is driving in a reverse direction.

Here, the sensors may include a gear stage detection sensor, a shift by wire detection sensor, a vehicle speed detection sensor, and a road slope detection sensor.

In addition, the controller may determine that the vehicle is driving in the reverse direction when the vehicle is driving in a direction opposite to a direction of a current gear stage of the vehicle.

According to the system and method for vehicle stop control according to the present disclosure, when it is detected that a vehicle is driving in a direction opposite to the direction of the current gear stage of the vehicle due to a driver's misjudgment or error while the vehicle is driving on an inclined road, the driver is warned of this and a control signal requesting P gear stage control and EPB engagement is transmitted to a transmission such that the vehicle enters an emergency braking state, thereby reducing the risk of an accident and improving stability of a braking system.

In addition, the vehicle stop control system of the present disclosure can respond flexibly to variables such as the failure of an existing vehicle due to production deviation and aging of vehicle parts, which is one limitation of a braking system by an electronic control system in certain existing vehicles, or external environmental factors of the vehicle, thereby reducing the risk of an accident and improving stability of a braking system so as to increase the reliability of the stop control system.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
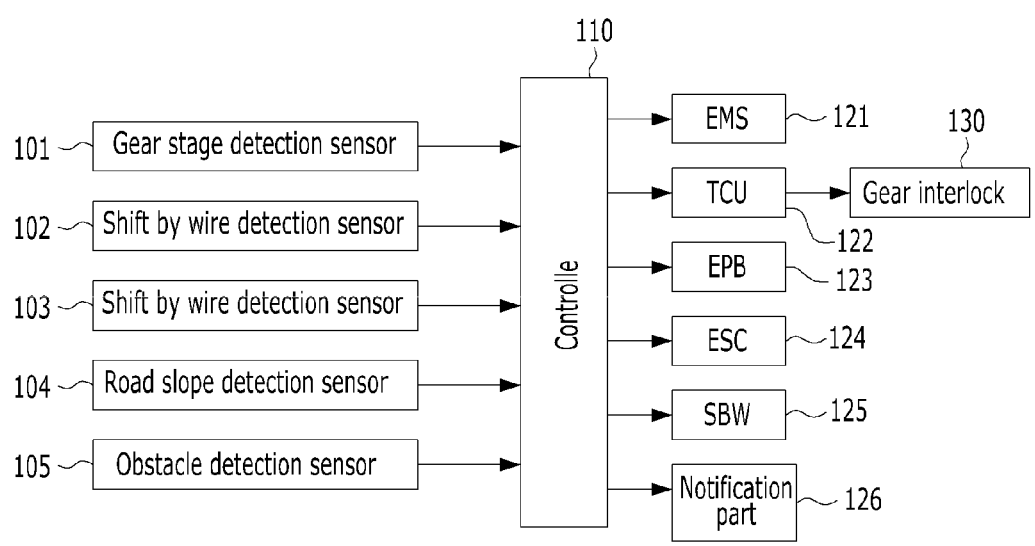
FIG. 1 is a block diagram illustrating main parts of a vehicle stop control system according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an embodiment of the present disclosure will be described in detail with reference to the accompanying drawings such that those skilled in the art to which the present disclosure belongs can easily embody the present disclosure.

However, the present disclosure may be embodied in several different forms and is not limited to the embodiment described herein. In addition, it should be noted that parts denoted by the same reference numerals throughout the detailed description mean the same components.

Hereinafter, a system and a method for vehicle stop control according to the embodiment of the present disclosure will be described in detail with reference to the accompanying drawings.

FIG. 1 is a block diagram illustrating the main parts of the vehicle stop control system according to the present disclosure.

Referring to FIG. 1, the vehicle stop control system according to the present disclosure includes a plurality of sensors 101 to 105 which detect the external driving environment of a vehicle and a controller 110 to which vehicle driving environment information detected by the sensors 101 to 105 is input. The vehicle stop control system further includes an engine management system (EMS) 121, and a transmission control unit (TCU) 122, an electronic parking brake (EPB) 123, an electronic stability control (ESC) 124, and a shift by wire (SBW) 125 which are control systems involved in the driving and braking systems of the vehicle and are controlled by the controller 110.

Here, the sensors which detect the external driving environment of a vehicle may include a gear stage detection sensor 101 which detects the current gear stage of the vehicle, a shift by wire detection sensor 102 which detects the position of the SBW, a vehicle speed detection sensor 103 which detects the speed of the vehicle, a road slope detection sensor 104 which detects the slope of a road on which the vehicle is driving, and an obstacle detection sensor 105 which can detect whether there are obstacles in front of and behind the vehicle.

In addition, the controller 110 receives various information about the external driving environment of the vehicle such as the current gear stage of the vehicle, the position of the SBW, a vehicle speed, a road slope, and whether there are obstacles in front of and behind the vehicle detected respectively by the gear stage detection sensor 101, the shift by wire detection sensor 102, the vehicle speed detection sensor 103, the road slope detection sensor 104, and the obstacle detection sensor 105 so as to identify the current driving state of the vehicle, and controls the driving and braking systems of the vehicle according to a preset series of control logic (see FIG. 2) so as to perform or release the emergency stop (emergency braking) of the vehicle.

That is, the controller 110 receives the vehicle driving environment information from the sensors 101 to 105 and identifies the current driving state of a vehicle. For example, when the controller 110 determines that a vehicle is driving in a reverse direction when the vehicle is driving in a direction opposite to the direction of the current gear stage of the vehicle, the controller 110 may transmit control signals to the EPB 123 and the TCU 122 so as to perform vehicle emergency stop control.

Figure 2:
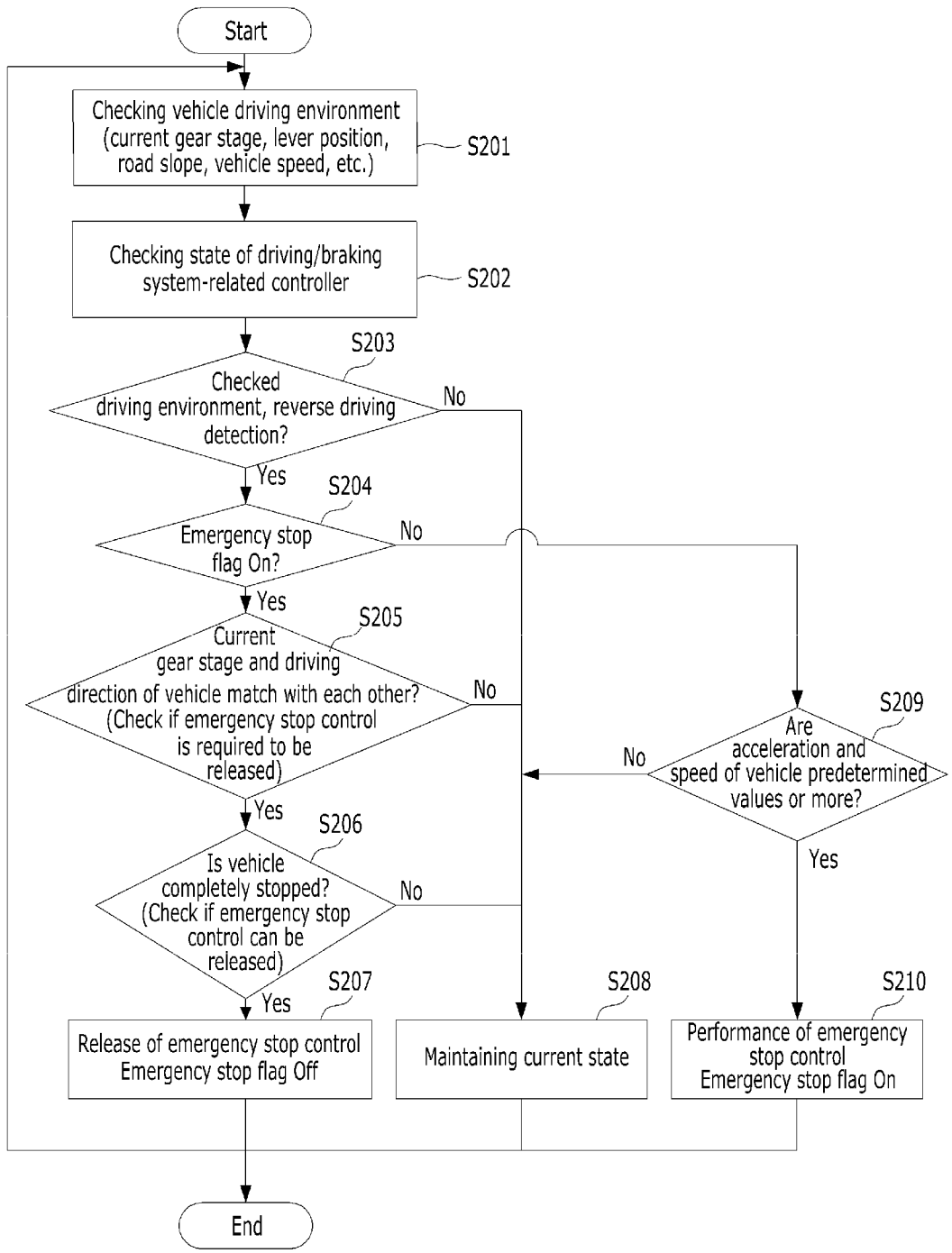
FIG. 2 is a flowchart sequentially describing a stop control process of a vehicle according to the present disclosure.

FIG. 2 is a flowchart sequentially describing the stop control logic of a vehicle by using the vehicle stop control system of the present disclosure illustrated in FIG. 1.

Referring to FIGS. 1 and 2, according to the vehicle stop control method according to the present disclosure, first, the external driving environment information of a vehicle such as a gear stage, an SBW position, and speed of a vehicle which is currently driving, a road slope, and whether there are obstacles in front of and behind the vehicle is detected by the gear stage detection sensor 101, the shift by wire detection sensor 102, the vehicle speed detection sensor 103, the road slope detection sensor 104, and the obstacle detection sensor 105 which are mounted to the vehicle, and is transmitted to the controller 110, and the controller 110 performs the work of converting the detected various external driving environment information into data to be used as system input information for the vehicle stop control at S201.

Next, the controller 110 identifies whether a road on which the vehicle is currently located is an inclined road and whether there are obstacles in front of and behind the vehicle, and determines whether a controller related to each of the driving and braking systems of the vehicle such as the EMS 121, the TCU 122, the EPB 123, the ESC 124, and the SBW 125 is operating normally at S202.

In addition, when it is checked that the controller related to the driving and braking systems of the vehicle is operating normally at S202, whether the vehicle is driving in a direction opposite to the direction of the current gear stage of the vehicle is determined on the basis of the various driving environment information of the vehicle detected at S201 at S203.

For example, when the gear stage of a shift by wire of a vehicle is an R gear stage (a reverse gear stage) due to a driver's misjudgment or error in the vehicle located on a downhill road, the vehicle may drive forward in a direction opposite to the direction of the current gear stage of the vehicle due to the slope of the downhill road although the gear stage of the vehicle is set as the R gear stage which is a reverse gear stage. In this case, when the vehicle drives at a speed of 3 km/s or more, an engine thereof may be turned off. At S203, as described above, it may be determined whether the vehicle is driving in a direction opposite to the direction of the current gear stage of the vehicle.

Accordingly, when it is detected that a vehicle is driving in a direction (the advancing direction of the vehicle) opposite to the direction of the current gear stage (for example, an R gear stage) of the vehicle, the engine of the vehicle may be turned off, resulting in a dangerous situation in which the vehicle is not braked. Accordingly, the controller 110 may transmit a control signal to a notification part 126 located on the dashboard of the vehicle so as to warn a driver that the vehicle is driving in an opposite direction to the current gear stage of the vehicle, and at the same time, may transmit a control signal to the EPB 123 so as to request EPB engagement and to perform vehicle emergency stop control in which a transmission performs P gear engagement at S210.

Here, when it is determined that the vehicle is not driving in the opposite direction to the current gear stage at S203, the vehicle may be controlled to maintain a current driving state thereof such that the vehicle drives normally in a current driving environment at S208.

Meanwhile, when it is determined that the vehicle is driving in the opposite direction to the current gear stage at S203, the vehicle enters S204, and at S204, it is determined whether the vehicle is currently under the emergency stop control (an emergency stop flag on).

Here, when it is checked that the vehicle emergency stop control is not performed, the vehicle enters S209 and it is determined whether each of the acceleration and speed of the vehicle is a preset value or more. Here, when each of the acceleration and speed of the vehicle reaches the preset value or more such that the vehicle is continuously driving in the reverse direction due to a driver's failure to stop the vehicle or the failure of the vehicle's braking system, the vehicle enters S210 and the driver is warned that the vehicle currently is in an emergency braking state, and a control signal is transmitted to the EPB 123 to request the urgent engagement of EPB and to perform the vehicle emergency stop control in which the transmission performs P gear engagement at S210.

Here, at S209, "the preset value" with which each of the acceleration and speed of the vehicle is compared is a value at which the speed of the vehicle driving in an opposite direction to the current gear stage of the vehicle may be judged to be dangerous as the speed of the vehicle increases, that is, a value preset as a threshold at which the engine of the vehicle is turned off, and such a preset value may be preset quantitatively differently according to the weight and engine output of the vehicle.

Furthermore, when the vehicle enters the emergency braking state at S210, the controller 110 outputs a signal to the notification part 126 located on the dashboard of the vehicle so as to inform a driver in the form of a waning sound or a waning message that the vehicle is under the emergency stop control. In this case, when the acceleration and speed of the vehicle do not reach the preset values at S209, the vehicle is controlled to maintain the current driving state thereof at S208.

Meanwhile, when it is checked that the vehicle is currently under the emergency stop control at S204, the vehicle enters S205 so as to check whether the vehicle emergency stop control is required to be released, and it is determined whether the current gear stage of the vehicle and the driving direction of the vehicle match with each other at S205.

Here, when the current gear stage of the vehicle and the driving direction of the vehicle do not match with each other, the state of the emergency stop control which is currently in progress is maintained at S208. Contrarily, when the current gear stage of the vehicle and the driving direction of the vehicle match with each other, the vehicle enters S206 so as to check whether the vehicle emergency stop control can be currently released, and it is determined whether the vehicle is completely stopped at S206.

In this case, at S206, whether the vehicle whose stop control is being performed is completely stopped and whether there are obstacles in front of and behind the vehicle are identified to check whether it is appropriate to release the vehicle stop control. Here, when it is checked that the vehicle is not completely stopped, the current situation of the vehicle which is under the emergency stop control is maintained at S208. Contrarily, when it is checked that the vehicle is completely stopped, the vehicle emergency stop control is released (an emergency stop flag off) at S207.

In this case, at S208 and S210 at which the vehicle emergency stop control is being performed, when it is checked that the EPB or SBW of the vehicle malfunctions, or that the vehicle is not completely stopped within a predetermined period of time although the EPB engagement and the P gear engagement of the transmission are performed, the controller 110 transmits an additional control signal to the TCU 122 so as to allow the TCU 122 to apply a gear interlock such that the emergency braking of the vehicle can be performed secondly.

In addition, when the vehicle emergency stop control is released at S207, the shifting system of the vehicle accepts a driver's P, R, or D gear shifting manipulation as a normal manipulation such that the gear of the vehicle is converted into the associated gear manipulated by the driver so as to maintain the normal driving state of the vehicle.

Furthermore, although not shown in the flowchart of FIG. 2, the vehicle stop control method may include determining whether the control of the gear interlock 130 by the TCU 122 is required prior to S210 at which the vehicle stop control is performed in a case in which the vehicle enters S210 at which the vehicle stop control is performed since the acceleration and speed of a vehicle reach preset values or more at S209.

In this case, prior to entering S210 from S209, the controller 110 may determine whether the control of the gear interlock 130 by the TCU 122 is required to perform the vehicle stop control through a general braking system (EPB engagement and P gear engagement), or may apply the gear interlock 130 by the TCU 122 to perform the vehicle emergency stop control.

In this case, the breakdown and malfunction of the driving and braking systems to be considered during the vehicle emergency stop control by the gear interlock described above may cause a failure to stop a vehicle at a D/R gear stage due to physical failure of a brake pedal, a failure to perform a parking brake engagement due to failure/wiring problem of an EPB controller, a failure to fix an N gear stage or manipulate a D/R gear stage due to a physical failure of an SBW, a failure to perform P gear engagement due to the failure of a parking solenoid controlled by a TCU, and slipping of a vehicle due to an unintentional shift to an N gear stage.

The above-described control process preferably does not end as a one-time process, but returns to an initial step after the vehicle stop control or after the release of the stop control is completed such that the control process is repeatedly performed in the same manner. In addition, when the vehicle stop control is being performed through the vehicle stop control logic at S201 to S204 and S209 and S210, only a stop control release condition at S205 and S206 is checked to release the vehicle stop control. In addition, when the vehicle stop control is released through the process of S205 and S206, only the conditions of S201 to S204 and S209 and S210 are checked again to perform the vehicle stop control. Accordingly, the performance and release of the vehicle stop control may be controlled complementarily to each other.

According to the system and method of the vehicle stop control of the present disclosure described above, when it is detected that a vehicle is driving in a direction opposite to the direction of the current gear stage of the vehicle due to a driver's misjudgment or error while the vehicle is driving on an inclined road, the driver is warned of this and a control signal requesting P gear stage control and EPB engagement is transmitted to a transmission such that the vehicle enters an emergency braking state so as to reduce the risk of an accident and improve stability of a braking system.

In the above, the exemplary embodiment of the present disclosure has been described, but the scope of the present disclosure is not limited to such a specific embodiment, and those skilled in the relevant field will be able to appropriately change the embodiment within the scope of the claims of the present disclosure.

What is claimed is:

1. A vehicle stop control method of a vehicle, the vehicle stop control method comprising the steps of:
    (a) converting, by a controller, vehicle driving environment information detected by a plurality of sensors mounted to the vehicle into data to be used as system input information;
    (b) checking, by the controller, whether a controller related to each of driving and braking systems of the vehicle operates normally;
    (c) determining, by the controller, whether the vehicle is driving in a reverse direction by the detected vehicle driving environment information; and
    (d) performing, by the controller, vehicle emergency stop control when it is determined that the vehicle is driving in the reverse direction;
    wherein, in the vehicle emergency top control of the step (d), engagement of an electronic parking brake (EPB)

of the vehicle is requested and at the same time, a transmission of the vehicle is controlled to perform P gear engagement; and wherein, when the vehicle is not completely stopped within a predetermined period of time despite the EPB engagement and the P gear engagement, an emergency braking of the vehicle is performed by a gear interlock through a control of a transmission control unit (TCU).

2. The method of claim 1, wherein the vehicle driving environment information comprises a current gear stage of the vehicle, a position of a shift by wire, a vehicle speed, a road slope, and whether there are obstacles in front of and behind the vehicle.

3. The method of claim 1, wherein the driving and braking systems of the vehicle comprise an engine management system (EMS), a transmission control unit (TCU), an electronic parking brake (EPB), an electronic stability control (ESC), and a shift by wire (SBW).

4. The method of claim 1, further comprising:
a step (c-1) of determining whether the vehicle emergency stop control is being performed when it is checked that the vehicle is driving in a direction opposite to a direction of a current gear stage of the vehicle after the step (c).

5. The method of claim 4, further comprising:
a step (c-2) of determining whether each of acceleration and speed of the vehicle is a preset value or more when it is checked that the vehicle emergency stop control is not performed in the step (c-1).

6. The method of claim 5, wherein when it is checked that each of the acceleration and speed of the vehicle is the preset value or more in the step (c-2), a warning sound or a warning message to inform a driver of this is output while performing the vehicle emergency stop control, but when each of the acceleration and speed of the vehicle is less than the preset value, a current state of the vehicle is maintained.

7. The method of claim 4, further comprising:
a step (c-3) of determining whether the current gear stage of the vehicle and a driving direction of the vehicle match with each other when it is checked that the vehicle emergency stop control is being performed in the step (c-1).

8. The method of claim 7, further comprising:
a step (c-4) of determining whether the vehicle is completely stopped when it is checked that the current gear stage of the vehicle and the driving direction of the vehicle match with each other in the step (c-3).

9. The method of claim 8, wherein when it is checked that the vehicle is completely stopped in the step (c-4), the vehicle emergency stop control is released.

10. The method of claim 9, wherein when the vehicle emergency stop control is released, a driver's P, R, or D gear shifting manipulation is accepted such that the gear stage of the vehicle is converted into an associated gear stage.

11. A vehicle stop control system comprising:
a controller to which vehicle driving environment information detected by a plurality of sensors mounted to a vehicle is transmitted, the controller being configured to identify a current driving state of the vehicle by the driving environment information and to transmit a control signal to each of an electronic parking brake (EPB), requesting engagement of the EPB, and a transmission control unit (TCU), for controlling a transmission of the vehicle to perform P gear engagement, so as to perform vehicle emergency stop control when it is determined that the vehicle is driving in a reverse direction;

wherein, when performing the vehicle emergency stop control, the controller transmits the control signal to the EPB and the control signal to the TCU at the same time; and wherein, when the vehicle is not completely stopped within a predetermined period of time despite the EPB engagement and the P rear engagement, an emergency braking of the vehicle is performed by a gear interlock through a control of the TCU.

12. The system of claim 11, wherein the sensors comprise a gear stage detection sensor, a shift by wire detection sensor, a vehicle speed detection sensor, and a road slope detection sensor.

13. The system of claim 11, wherein the controller determines that the vehicle is driving in the reverse direction when the vehicle is driving in a direction opposite to a direction of a current gear stage of the vehicle.

* * * * *